US00RE44651E

(19) United States
(12) Reissued Patent
Kim

(10) Patent Number: US RE44,651 E
(45) Date of Reissued Patent: Dec. 17, 2013

(54) APPARATUS AND METHOD FOR AN ADDITIONAL CONTENTS DISPLAY OF AN OPTICAL DISC PLAYER

(75) Inventor: Young-Chul Kim, Seoul (KR)

(73) Assignee: LG Electronics Inc., Seoul (KR)

(21) Appl. No.: 11/902,929

(22) Filed: Sep. 26, 2007

Related U.S. Patent Documents

Reissue of:
(64) Patent No.: 6,253,221
Issued: Jun. 26, 2001
Appl. No.: 08/878,600
Filed: Jun. 19, 1997

U.S. Applications:
(63) Continuation of application No. 10/606,363, filed on Jun. 26, 2003, now Pat. No. Re. 42,441.

(30) Foreign Application Priority Data

Jun. 21, 1996 (KR) ..... 96-22891

(51) Int. Cl.
*G06F 7/00* (2006.01)

(52) U.S. Cl.
USPC ..... 707/736

(58) Field of Classification Search
USPC ..... 707/736
See application file for complete search history.

(56) References Cited

U.S. PATENT DOCUMENTS 4,079,458 A 3/1978 Rider et al.
5,010,417 A 4/1991 Yoshio et al.
5,233,333 A 8/1993 Borsuk
5,251,293 A 10/1993 Ishii et al.
5,280,572 A 1/1994 Case et al.
5,521,613 A 5/1996 Hayashi
5,541,663 A 7/1996 Ohno
5,652,824 A 7/1997 Hirayama et al.
5,712,663 A 1/1998 Matsumoto
5,721,720 A 2/1998 Kikuchi et al.
5,731,847 A 3/1998 Tsukagoshi
5,767,845 A 6/1998 Oashi et al.

(Continued)

FOREIGN PATENT DOCUMENTS

JP 404146568 A * 5/1992 ..... G11B 20/00
KR 96-700510 A 1/1996

OTHER PUBLICATIONS

Intermedia World, '96 showcases future home theater experience through the introduction of digital video discs (DVD), PR Newswire, pp. 1-2, Feb. 1996.*

*Primary Examiner* — Michael Le
(74) *Attorney, Agent, or Firm* — Birch, Stewart, Kolasch & Birch, LLP

(57) ABSTRACT

This invention relates to a character display apparatus and method for a DVD (Digital Versatile Disc) player. According to the present invention, it is provided that font data of at least some of multi-languages to be used in multilingual subtitle processing are recorded on certain area(s) of a DVD, the recorded font data are stored in a font memory at initial stage of playback, the stored font data corresponding to a language selected by selection input of a user are then read, characters for subtitle processing of the selected language are displayed. Therefore, the manufacturing cost of DVD players can be reduced due to the reduction of memory capacity requied and DVDs can be maximum efficiently utilized.

6 Claims, 3 Drawing Sheets

(56) References Cited

U.S. PATENT DOCUMENTS

| | | | |
|---|---|---|---|
| 5,805,153 | A | 9/1998 | Nielsen |
| 6,020,982 | A | 2/2000 | Yamauchi et al. |
| 6,128,434 | A | 10/2000 | Hirayama et al. |
| 6,130,722 | A | 10/2000 | Bae et al. |
| 6,144,414 | A | 11/2000 | Toba |
| 6,208,383 | B1 | 3/2001 | Park |
| 2004/0081434 | A1 | 4/2004 | Jung et al. |

* cited by examiner

| VMGI | VTS#1 | VTS#2 | ..... | VTS#n | FONT DATA |
|---|---|---|---|---|---|

APPARATUS AND METHOD FOR AN ADDITIONAL CONTENTS DISPLAY OF AN OPTICAL DISC PLAYER

Matter enclosed in heavy brackets [ ] appears in the original patent but forms no part of this reissue specification; matter printed in italics indicates the additions made by reissue.

*This application is a Continuation Application of Reissue application Ser. No. 10/606,362, filed Jun. 26, 2003 now U.S. Pat. No. Re. 42,441, which is a Reissue of U.S. Pat. No. 6,253,221, issued on Jun. 26, 2001; and for which priority is claimed under 35 U.S.C. §120; and this application claims priority to Korean Patent Application No. 22891/1996 filed in Republic of Korea on Jun. 21, 1996 under 35 U.S.C. §119. The entire contents of these applications and U.S. Pat. No. 6,253, 221 are hereby incorporated by reference.*

BACKGROUND OF THE INVENTION

1. Field of the Invention

The present invention relates to character display for a digital versatile disc (DVD) player and particularly to a character display apparatus and method for a DVD player using font data recorded on a disc.

2. Description of the Prior Art

FIG. 1 is a block diagram of a conventional character display system for a DVD player. As shown in FIG. 1, conventional character display system is provided with a pickup 102 for detecting data recorded on a disc 101, a high frequency processing section 103 for processing the detected data of the pickup 102 and outputting video signals, a font ROM 104 for storing font data corresponding to multi-languages, a character generation section 105 for receiving the font data stored in the font ROM 104 and generating character signals of characters for subtitle processing a language selected by a user, and a controller 106 for controlling the high frequency processing section 103, the font ROM 104 and the character generation section 105.

The operation of the conventional character display system will be described hereinafter.

First, when a disc is inserted in a DVD player thereby initiating a playback, the pickup 102 detects data recorded on the disc and outputs them to the high frequency processing section 103.

Accordingly, the high frequency processing section 103 processes the detected data of the pickup 102 and outputs video signals thereby displaying images on a screen.

At this time, if the user inputs a language selection key signal (not shown), the controller 106 recognizes it and controls the character generation section 105.

Thus, the character generation section 105 reads the font data of the language selected by the user among the font data of the multi-languages stored in the font ROM 104 for multilingual character subtitle processing and outputs the corresponding character signals.

However, conventionally, font data of all the multi-languages had to be stored in the DVD player, if multilingual character subtitle processing is needed (for example, 32 languages in standard for DVD players). As a result, ROM (s) having larger memory capacity must be used thereby increasing the cost of manufacturing DVD players.

SUMMARY OF THE INVENTION

To solve the above problem with the conventional character display system, an object of the present invention is to provide a character display apparatus for a DVD player which is capable of reducing the memory capacity neeeded for multilingual character subtitle processing.

Another object of the present invention is to provide a character display method for a DVD player which is capable of reducing the memory capacity necessary for multilingual character subtitle processing.

Yet another object of the present invention is to provide a DVD that is used in the character display apparatus and method to reduce the memory capacity needed in the player.

Still another object of the present invention is to maximize the efficiency of use of a DVD.

To accomplish the above objects, one aspect of the present invention is to provide a character display apparatus for a DVD player which outputs character signals of a language selected from multi-languages to be used in the multilingual character subtiltle processing, on the basis of font data at least some of which are recorded in a DVD.

The character display apparatus may comprise a detection and separation means for detecting the recorded data including the font data from the DVD, and for separating the font data from the detected data; a first memory means for storing font data output from the detection and separation means; a character generation means for outputting the character signals of the selected language for subtitle processing by using the font data stored in the first memory means; and a control means for controlling the detection and separation means, the first memory means and the character generation means.

Further, the detection and separation means may comprise a pickup means for detecting the recorded data including the font data from the DVD, and for outputting the detected data; a high frequency processing means for processing detected data output from the pickup means, and for outputting video data signals; and a data separation means for separating the font data from the output signals of the high frequency processing means, and for outputting the separated font data. The control means may control the high frequency processing means, the data separation means, the first memory means and the character generation means.

The character display apparatus may, in addition, comprises a second memory for storing font data of some of the multi-languages. The control means may control the character generation means to output character signals of the selected language for subtitle processing by using the font data of the selected language from the second memory if the font data of the selected language is not on the DVD.

According to one aspect of a character display method for a DVD player of this invention, character signals of a language selected from multi-languages to be used in the multilingual character subtitle processing on the basis of font data at least some of which are recorded in a DVD are output for subtitle processing.

The character display method may comprise steps of: detecting the recorded data including the font data from the DVD, and separating the font data from the detected data; storing the separated font data output from detecting and separating step in a first memory means; and outputting the character signals of the selected language for subtitle processing by using the font data stored in the first memory means.

Further, the detecting and separating step may comprise the substeps of detecting and outputting the recorded data including the font data from the DVD; processing the recorded data output from the detecting and outputting substep, and outputting video data signals; and separating the font data from the video data signals, and for outputting the separated font data.

Further, the player may further comprise a second memory for storing font data of some of the multi-languages, and in the step of outputting the character signals of the selected language for subtitle processing, the character signals of the selected language may be output by using the font data of the selected language stored in the second memory if the character signals of the selected language, for subtitle processing are not on the DVD.

According to another aspect of the character display method for a DVD player of this invention, the method comprises a first step for determining whether font data of at least some of multi-languages to be used in multilingual subtitle processing are recorded in a DVD if the DVD is inserted in the player; a second step for storing font data of at least some of the recorded languages in a first memory, if the font data of characters of languages related to the multilingual subtitle processing are stored in the DVD; and a third step for outputting character signals of a selected language for subtitle processing according to the font data stored in the first memory when one of the multi-languages is selected.

In the above, the player may further comprise a second memory for storing font data of some of the multi-languages, and the character signals of the selected language for subtitle processing in the third step may be output by using the font data of the selected language from the second memory if the character signals of the selected language for subtitle processing are not recorded on the DVD.

Further, the present invention provides a DVD on which font data of at least some of multi-languages to be used in the multilingual subtitle processing are recorded.

Generally, it is possible for a DVD player to subtitle-process 32 languages according to its standard. Thus font data of each of the above exemplified 32 languages are needed for selective subtitle processing of the 32 languages. However, according to the abovementioned construction of the present invention, the relevant characters of a selected language are displayed by reading out font data of the selected language when character display is selected after font data of at least some of 32 languages recorded on a predetermined area of the DVD have been downloaded, and stored into a RAM(s) at the beginning of a playback.

Namely, the present invention may exclude font data of at least some of the languages among the multi-languages from the font ROM. For example, on the basis of recorded contents of a disc, font data of languages with less chance to be selected by users can be recorded on a disc through discussion with manufacturers. Therefore the capacity of the font ROM may be reduced ralative to the conventional character display system where all of the font data of 32 languages must be recorded on the font ROM.

Other and further objects, features and advantages of the invention will be apparent from the following description.

BRIEF DESCRIPTION OF THE DRAWINGS

A detailed description of this invention will be given with reference to the accompanying drawings.

DESCRIPTION OF THE PREFERRED EMBODIMENTS

Figure 1:
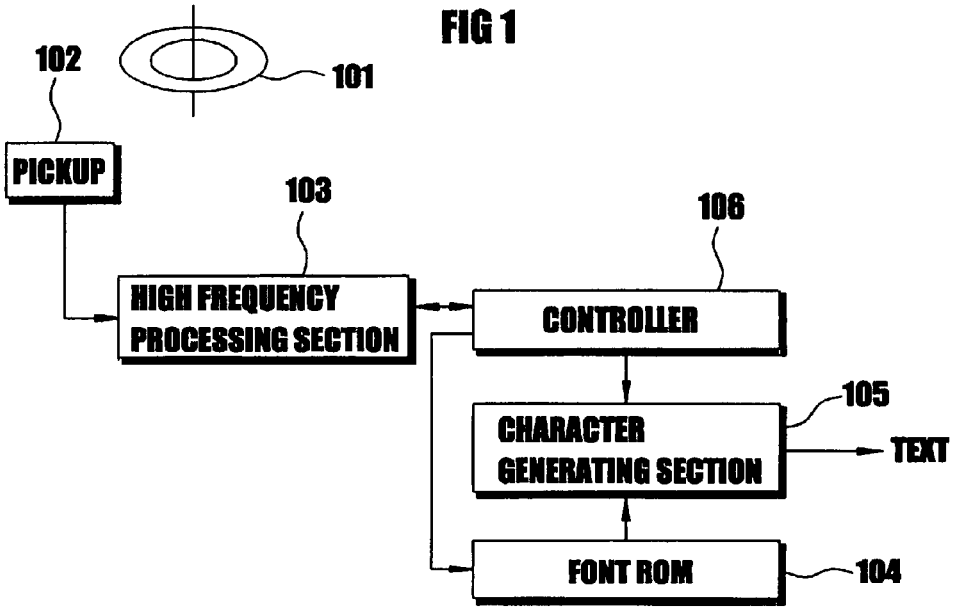
FIG. 1 is a block diagram of a conventional character display system for a DVD player.
Figures 2, 3:
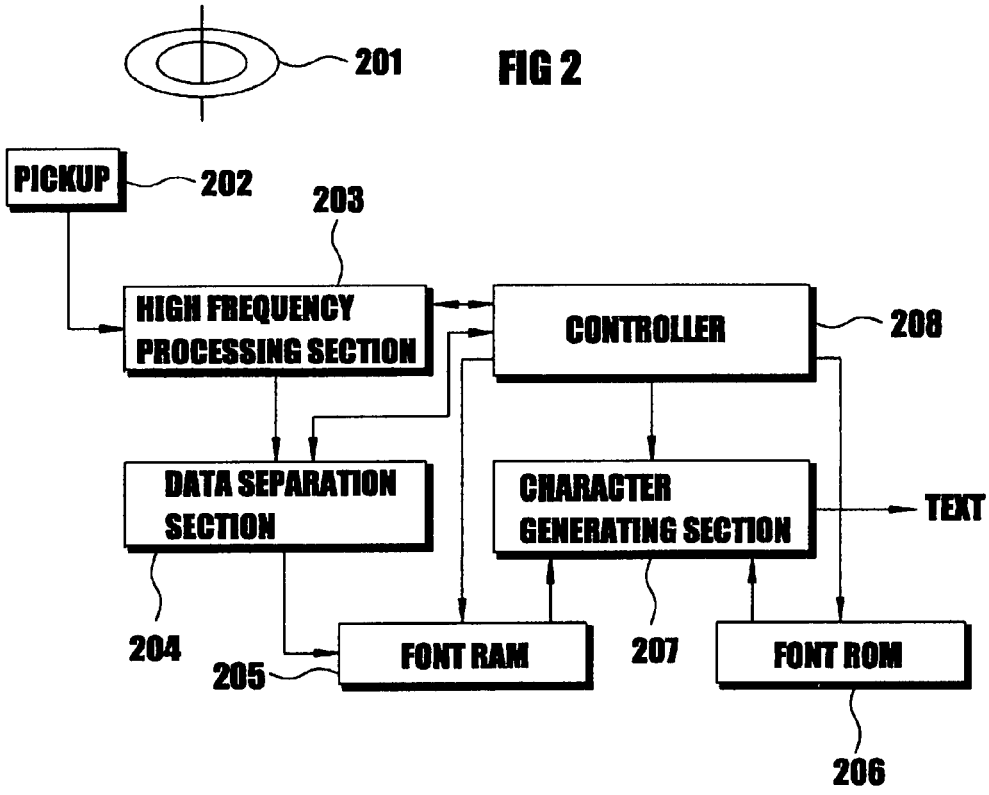
FIG. 2 is a block diagram of an embodiment of the character display apparatus for a DVD player according to the present invention.
FIG. 3 is an illustration of a recording format of a disc.

FIG. 2 is a block diagram of an embodiment of the character display apparatus for a DVD player according to the present invention As shown, the character display apparatus for a DVD player according to the embodiment of the present invention is provided with a pickup 202 which detects recorded data including font data of at least some of multi-languages to be used in multilingual subtitle processing from a disc 201; a high frequency processing section 203 for processing output signals of the pickup 202 and outputting video data signals; a data separation section 204 for separating the font data from output signals of the high frequency processing section 203; a font RAM 205 for storing output data of the data separation section 204; a font ROM 206 for storing predetermined font data; a character generation section 207 for receiving the output data from the font RAM 205 and the output data from the font ROM 206, and outputting character signals; and a controllor 208 for controlling operations of the high frequency processing section 203, the font data separation section 204, the character generation section 207, the font RAM 205, and the font ROM 206.

The operation of the present invention constructed as above will be explained hereinafter.

First, when the disc 201 is inserted, the pickup 202 picks up a recording surface of the disc 201 including a predetermined area or predetermined areas on which the font data are recorded, and outputs the detected video management information to the high frequency processing section 203.

Then, when the high frequency processing section 203 processes the deteced signals of the pickup 202 and outputs video signals, the controller 208 determines whether font data are on the disc 201.

Here, information stored on the disc 201 is comprised of Video Managing Information(VMGI), Video Title Section (VTS#1~VTS#n) and font data, as shown in FIG. 3.

At this time, Video Managing Information (VMGI) has information concerning the existence, position and size of the recorded font data.

Accordingly, if font data are recorded on the disc 201, controller 208 controls the servo (not shown) so as to move the pickup 202 to the position where the font data are recorded.

Then, when the pickup 202 plays back the font data recorded on the disc 201, the high frequency processing section 203 processes the reproduced font data and outputs video signals, and the data separation section 204 separates the font data from the output signals of the high frequency processing section 203 and stores the separated font data into the font RAM 205.

After this, when the storing of the recorded font data into the font RAM 205 is completed, the controller 208 controls the servo (not shown) so as to move the pickup 202 to the initial playback position.

Accordingly, when the pickup 202 detects data recorded on the disc 201, output signals of the high frequency processing section 203 which processes the detected data are signal-processed in a predetermined way to play back titles, and the controller 208 under playback determines whether input of the menu keys has been made.

At this time, when there has been input of menu keys, the controller 208 determines whether font data corresponding to the input are on the disc 201.

Accordingly, when corresponding font data are on the disc 201, the character generation section 207 controlled by the controller 208 reads data stored in the font RAM 205 and outputs character signals thereby displaying menu on a screen.

On the other hand, when corresponding font data are not recorded on the disc 201, the character generation section 207 controlled by controller 208 reads data stored in the font ROM 206 and outputs character signals thereby displaying menu on the screen.

Figure 4:
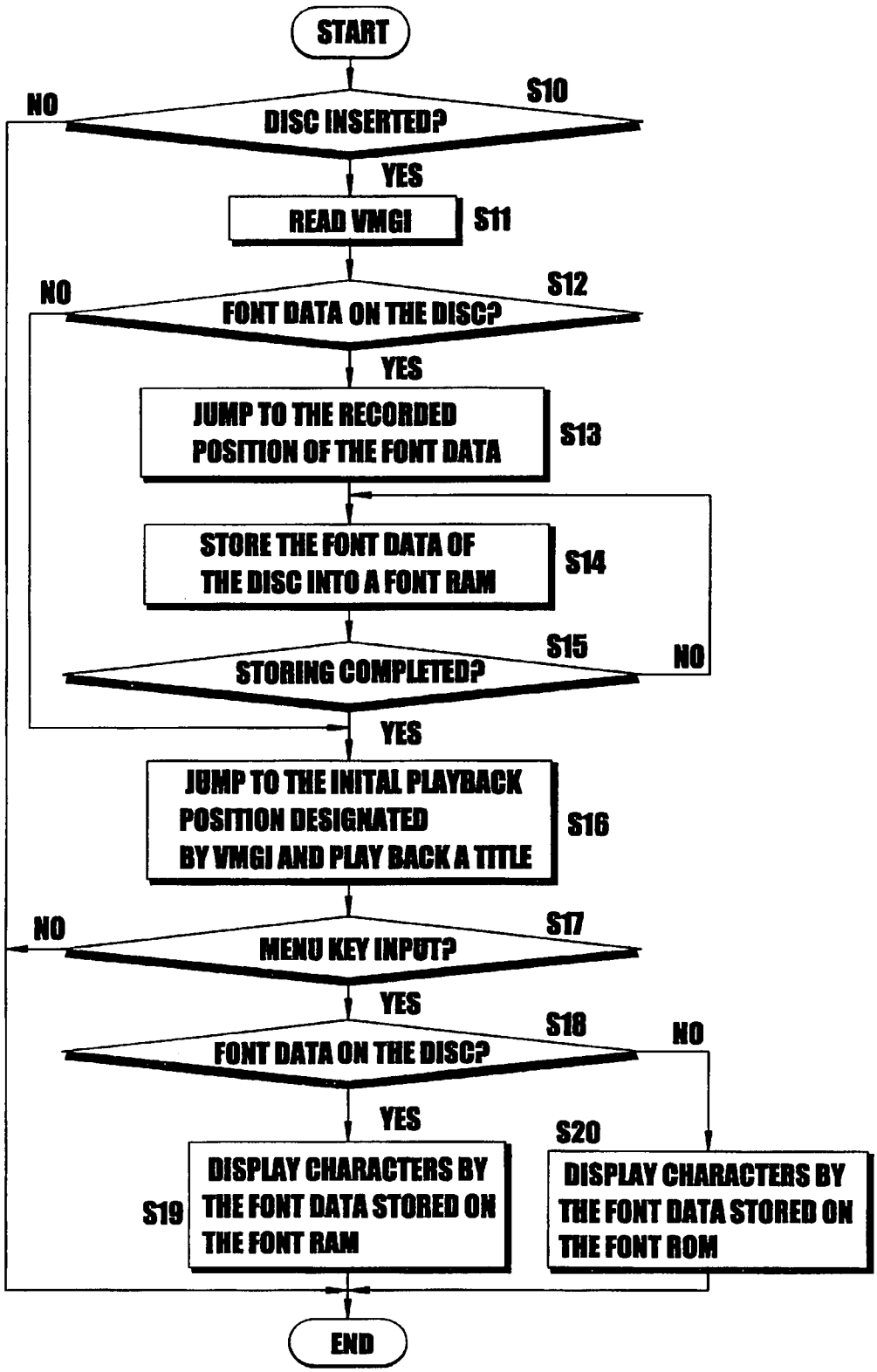
FIG. 4 is a flow chart showing the character display according to the present invention.

The above operation will be explained with reference to the flow chart shown in FIG. 4.

Namely, when the disc 201 is inserted at step S10, Video Managing Information (VMGI) recorded at certain area is read at step S12 and it is determined at step S11 whether font data are recorded on the disc 201.

Then, if font data are recorded on the disc 201, the pickup 202 is jumped to the position where the font data are recorded so as to detect the font data recorded on the disc 201 at step S13.

Accordingly, when the high frequency processing section 203 processes output signals of the pickup 202 and outputs video signals, the font data separation section 204 separates the font data from the output video signals and store the separated font data into the font RAM 205 at step S14.

Thereafter, when it is determined at step S12 that font data is not recorded on the disc 201, or the storing of the font data into the font RAM 205 is completed at step S15, the pickup 202 is moved to the initial playback position designated by Video Managing Information (VMGI), and plays back a title at step S16.

At this time, if input of the menu keys is made at step S17, it is determined at step S18 whether font data corresponding to the language selected by a user exist on the disc 201 so as to determine whether the font RAM 205 or the font ROM 206 is to be used as a source for the font data of the language selected by the user.

Accordingly, when the corresponding font data are on the disc 201 at step S18, the control flow goes to step S19, and then the character generation section 207 uses the font data stored on the font RAM 205 to output character signals thereby displaying subtitle in the selected language on a screen at step S19.

Otherwise, the control flow goes to step S20, and then the character generation section 207 uses the font data stored on the font ROM 206 to output character signals thereby displaying subtitle in the selected language on a screen at step S20.

According to the above embodiment of the present invention, it is provided that font data of at least some of the multi-languages to be used in multilingual subtitle processing, for example, rarely used font data are recorded (preformatted) on a disc, and then, stored into a font RAM, the font data of a language selected by a user are used from the font RAM thereby subtitle in the desired language (character) is being displayed on playback.

However, according to the present invention, it is also possible to record(format) font data corresponding to all languages on certain areas of a disc, to store the font data into a font RAM, to read the font of a language selected by a user from the font RAM and to display subtitle in the desired language (character). In this case, the font ROM 206 in FIG. 2 is not necessary.

As explained in detail above, the character display apparatus and method for a digital versatile disc (DVD) player according to the present invention record font data of at least some of multi-languages to be used in multilingual subtitle processing on certain area(s) of a disc, store the font data into a memory at initial stage of playback, read the stored font data corresponding to a language selected by selection input of a user and display character signals of the selected language for subtitle processing. Thus, the manufacturing cost can be reduced due to reduction of memory capacity requied and further DVDs can be maximum efficiently utilized.

As will be evident to those skilled in the art, various modifications of this invention can be made or followed in light of the foregoing disclosure without departing from the spirit of the disclosure or from the scope of the claims.

What is claimed is:

[1. A character display apparatus for an optical disc player, comprising:

a detection and separation unit to detect recorded data including a font data from said optical disc, and to separate said font data from the recorded data detected;

a memory to store the font data output from said detection and separation unit;

a character generation unit to generate character signals of characters of a selected language for a subtitle by using the font data stored in said memory; and a controller coupled to the character generation unit, to cause the character generation unit to generate character signals of a language for subtitle processing selected from multi-languages to be used in multilingual character subtitle processing on the basis of font data, at least some of which are recorded in the optical disc.]

[2. The character display apparatus according to claim 1, wherein said detection and separation unit comprises:

a pickup to detect the recorded data including said font data from said optical disc, and to output the recorded data detected as output signals;

a high frequency processing unit to process the output signals of said pickup, and to output video data signals; and a data separation unit to separate said font data from the output video data signals of said high frequency processing unit, and to output the separated font data, wherein said controller controls said high frequency processing unit, said data separation unit, said first memory and said character generation unit.]

[3. The character display apparatus according to claim 1, wherein said character display apparatus further comprises a second memory for storing font data of predetermined languages, and wherein said controller controls said character generation unit to output character signals of characters of the selected language for subtitle processing by using the font data of the selected language from said second memory if the font data of the selected language are not on said optical disc.]

[4. A character display method for an optical disc player, comprising:

detecting recorded data including a font data recorded in said optical disc, and outputting said recorded data detected as output signals;

processing the output signals, and outputting video signals;

separating said font data from the video signals, and outputting the font data separated;

storing the font data in a first memory; and outputting the character signals of a selected language for subtitle processing by using the font data stored in said first memory.]

[5. The character display method according to claim 4, wherein said player further comprises a second memory for storing font data of predetermined languages, and wherein said step of outputting the character signals of the selected language for subtitle processing includes outputting the character signals by using the font data of the selected language from said second memory if the font data of the selected language are not on said optical disc.]

[6. A character display method for an optical disc player, comprising:

determining whether font data of at least some of multi-languages to be used in multilingual subtitle processing are recorded in an optical disc;

storing the font data of at least some of the multi-languages in a first memory, if the font data of characters of languages for multilingual subtitle processing are stored in said optical disc; and outputting character signals of a selected language for subtitle processing according to the font data stored in said first memory when one of said multi-languages is selected, and outputting the character signals by using the font data of the selected language from a second memory if the font data of the selected language are not recorded in said disc.]

[7. A character display apparatus for an optical disc player, comprising:

a data separator to separate font data to be used in multilingual subtitle processing from a predetermined area of an optical disc;

a first memory to store the separated font data;

a second memory to store predetermined font data to be used in multilingual subtitle processing;

a character generator to generate character signals of a language for the subtitle processing from stored font data; and a controller to cause the character generator to generate character signals from the font data stored in the first or second memory, based on a selected language, thereby outputting character signals of a language for subtitle processing selected from multi-languages to be used in multilingual character subtitle processing on the basis of font data, at least some of which are recorded in the optical disc.]

[8. The character display apparatus according to claim 7, wherein the first memory is a random access memory and the second memory is a read only memory.]

[9. A character display method for an optical disc player, comprising:

selecting a language for subtitle processing from multi-languages;

separating font data from other data read from a disc;

storing the separated font data in a first memory; and generating character signals from the stored font data or from predetermined font data stored in a second memory, thereby outputting character signals of a language for subtitle processing selected from multi-languages to be used in multilingual character subtitle processing on the basis of font data, at least some of which are recorded in the optical disc.]

[10. The character display apparatus according to claim 9, wherein said generating step includes generating the character signals from the predetermined font data if the selected language does not correspond to the stored font data in the first memory.]

[11. A system for generating character signals for a language of a subtitle recorded in an optical disc, said optical disc including at least a predetermined area on which a font data for generating character signals to be used in multilingual subtitle processing are located, comprising:

an optical pickup to read recorded data including the font data to be used in multilingual subtitle processing;

a data processor to process the font data read from the optical pickup;

a first memory to store the font data;

a second memory to store predetermined font data to be used in multilingual subtitle processing;

a character generator to generate character signals of a language for the subtitle processing from stored font data; and a controller to cause the character generator to generate character signals from the font data stored in the first or second memory, based on a selected language, thereby outputting character signals of a language for subtitle processing selected from multi-languages to be used in multilingual character subtitle processing on the basis of font data, at least some of which are recorded in the optical disc.]

*12. A non-transitory optical recording medium, comprising:*

*a first area to store managing information for managing video data;*

*a second area to store a video title including video data; and*

*a third area to store additional contents associated with the video title,*

*wherein when a multimedia player reads the non-transitory optical recording medium, the multimedia player detects if the additional contents data includes first font data, and if the additional contents includes the first font data, stores the first font data in a first storage of the multimedia player, and generates character data of specific presentation data to be presented while the video data is played on the multimedia player to have a font defined by the first font data, and if the additional contents data does not include the first font data, generates the character data of the specific presentation data to be presented while the video data is played to have a font defined by a second font data stored in a second storage of the multimedia player, and*

*wherein the first and second font data are different than the character data of the specific presentation data.*

*13. A multimedia player, comprising:*

*a detector configured to detect additional contents data associated with a main title including video data from an additional contents data source, and to detect if said additional contents data includes first font data;*

*a first storage configured to store said detected additional contents data;*

*a second storage configured to store second font data that is separate from the first font data; and*

*a controller configured to, if the detector detects the additional contents includes the first font data, store the first font data in the first storage, generate character data of specific presentation data to be presented while the video data is played on the multimedia player to have a font defined by the first font data, and if the detector detects the additional contents data does not include the first font data, generate the character data of the specific presentation data to be presented while the video data is played to have a font defined by a second font data stored in the second storage of the multimedia player, and*

*wherein the first and second font data are different than the character data of the specific presentation data.*

*14. The multimedia player according to claim 13, wherein said additional contents data source includes an optical recordable medium.*

*15. A method of controlling a multimedia player, the method comprising:*

*detecting, via a detector of the multimedia player, additional contents data associated with a main title including video data from an additional contents data source;*

*detecting, via the detector, if said additional contents data includes first font data;*

*storing, in a first storage of the multimedia player, said detected additional contents data;*

*storing, in a second storage of the multimedia player, second font data that is separate from the first font data;*

*if the detecting step detects the additional contents includes the first font data, storing the first font data in the first storage, and generating character data of specific presentation data to be presented while the video data is played on the multimedia player to have a font defined by the first font data; and*

*if the detecting step detects the additional contents data does not include the first font data, generating the character data of the specific presentation data to be presented while the video data is played to have a font defined by a second font data stored in a second storage of the multimedia player,*

*wherein the first and second font data are different than the character data of the specific presentation data.*

*16. The method according to claim 15, wherein said first storage is a random access memory.*

*17. The method according to claim 15, wherein said generating step generates character signals for displaying a selected language based on the first or second font data.*

* * * * *